(12) United States Patent
Bronswijk et al.

(10) Patent No.: US 6,948,793 B2
(45) Date of Patent: Sep. 27, 2005

(54) MULTI-FUNCTION MONITORING MODULE FOR A PRINTER

(75) Inventors: Tako K. A. M. Bronswijk, Gouda (NL); Karianne H. Lindenhovius, Eindhoven (NL); Wilhelmus A. G. Timmers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 111 days.

(21) Appl. No.: 10/424,634

(22) Filed: Apr. 28, 2003

(65) Prior Publication Data

US 2003/0202029 A1 Oct. 30, 2003

Related U.S. Application Data

(63) Continuation of application No. 09/668,540, filed on Sep. 25, 2000, now Pat. No. 6,419,342.

(30) Foreign Application Priority Data

Nov. 19, 1999 (EP) .............................................. 99203874

(51) Int. Cl.[7] ............................................. B41J 29/393
(52) U.S. Cl. ....................................................... 347/19
(58) Field of Search ............................... 347/19, 14, 11, 347/12, 15, 24, 43, 37

(56) References Cited

U.S. PATENT DOCUMENTS 6,378,976 B1 * 4/2002 Byers et al. ................... 347/19

* cited by examiner

*Primary Examiner*—Stephen D. Meler
*Assistant Examiner*—Charles Stewart, Jr.
(74) *Attorney, Agent, or Firm*—Aaron Waxler

(57) ABSTRACT

In a module for monitoring the print quality of a dot printer (10), comprising a radiation source (41), a condenser lens system (43') for forming an illuminated area (45) on a printing medium (13) and an imaging lens system (87,89) for imaging the illuminated area on a detector (49'), the detector comprises at least a linear array of detector elements and the imaging system is configured in such a way that both the illuminated area and a small portion thereof can be imaged. This allows detection of both the gray scale of a print line (35) and the size and colour of an individual dot. A dot printer provided with this modules gives an improved print quality.

17 Claims, 6 Drawing Sheets

MULTI-FUNCTION MONITORING MODULE FOR A PRINTER

CROSS REFERENCE TO RELATED APPLICATIONS

This is a continuation of application Ser. No. 09/668,540 filed Sep. 25, 2000 now U.S. Pat. No. 6, 419, 342.

The present invention relates to a module for monitoring the print quality of a dot printer, which monitor is to be fixed to a carriage for moving a printing device of the printer, said module comprising:

an illumination system for supplying a monitoring radiation beam to illuminate an area of a printing medium;

an imaging system for collecting monitoring radiation reflected by the illuminated area and forming an image in an image plane, and a radiation-sensitive detection system for converting said image into electric signals representing quality parameters of the print.

The invention also relates to a dot printer provided with such a monitoring module.

A dot printer is to be understood to be any kind of apparatus for writing an image on a recording medium whereby the medium produces marks, in the form of dots when exposed, for example, to energies above a threshold level. A number of such dots jointly constitutes a character, a sign, a graphic representation, etc. Well-known dot printers are laser printers, inkjet printers and thermal printers.

U.S. Pat. No. 5,633,672 discloses such an apparatus which comprises a communication channel for carrying an information signal representing the image to be written, a writing assembly, or writing device, coupled to said channel and modulated by the information signal for making marks, representing the image, on a printing medium in response to the signal, a device for producing a relative movement in one direction between the printing medium and said writing assembly to establish a pattern of marks in the direction of the relative movement.

The apparatus described in U.S. Pat. No. 5,633,672 further comprises a calibration instrument that reads the pattern of marks and adjusts the parameters of the apparatus in real time to calibrate the writing device and, when necessary, modify the characteristics of the marks and their pattern. The calibration instrument can be fixed to the drive, or carriage, for the writing device so that it is moved simultaneously with this device. By using this built-in calibration instrument, it is no longer necessary to remove printed images from the apparatus and analyze them off-line for the characterization of the marks and their pattern, which is a cumbersome and time-consuming process. The controlled writing parameters are the size, the relative position and the density of the dots. In the printer described in U.S. Pat. No. 5,633,672, the calibration instrument comprises an electronic (CCD) camera having an optical axis, and the marks are illuminated co-axially along the same axis. The camera receives a two-dimensional image of the recorded dots and their pattern, for example, if the recording medium carrier is a drum at each rotation of this drum, so that all dots of a print line, or of a number of print lines if the writing device is a multi-channel device, are taken in simultaneously. The camera reads the spatial and density information from the pattern.

It is an object of the present invention to provide a monitoring module of the kind described in the preamble, which module allows measurements on a dot-by-dot basis and, moreover, has a simple and compact construction. The module is characterized in that the detection system comprises at least a linear array of discrete detector elements, and in that means are provided for imaging, in the plane of the detector elements, both a medium area of a first kind, comprising a number of printed dots, and a medium area of a second kind, comprising one printed dot.

By means of this module it is not only possible to image a portion of a print line on the detection system and observe it, to monitor the density or gray scale of the print line portion and to detect the edges of the recording medium, or print paper, but it is also possible to image an individual dot on the detection system. The detection system has detector elements which are so small relative to the image of a dot that such an image covers several detector elements, or pixels, so that characteristics of an individual dot, like its size, can be measured.

The monitoring and calibration can be carried out during a test before recording the desired image, or concurrently with image recording.

It is to be noted that EP Patent 0.186.651 discloses a thermal printer wherein individual dot areas are monitored, however during dot formation and not after the dot formation has been completed. The printer described in EP Patent 0.186.651 is used to carry out a special method of thermal printing. First, initial energy is applied to selected areas of the recording medium to form, in each area, a dot having an initial size which is smaller than necessary to achieve the desired density in the selected area. This area is monitored against a reflective background, in the form of a reflective layer on the rear side of the transparent record medium, by illuminating the area and capturing radiation reflected by the area by a single detector element. This element supplies a signal which is indicative of the density of the area. This signal is compared with a desired image signal and the result of the comparison is used to regulate further supply of thermal energy to progressively increase the dot size in the area until a predetermined value of density is achieved. In the thermal printer described in EP Patent 0.186.651, a dot is not monitored by a number of detector elements and no image of a portion of a print line is formed on the detection system.

A first embodiment of the module is characterized in that said means for imaging comprises an actuator for positioning the imaging system in either one of two fixed positions along the axis of said imaging system.

In this embodiment, the same lens element(s) of the imaging system is (are) used to image both an individual dot and a print line portion on the detection system. When the imaging system occupies a first one of said positions, a dot is sharply imaged on the detection system and when the imaging system occupies the second position, a portion of the print line is imaged on the detection system. The detection system then receives either an image of an individual dot or an image of the print line portion.

It is also possible to image the individual dot and the print line portion simultaneously on the same detection system. This can be realized with an embodiment of the module which is characterized in that said means for imaging comprises a first and a second sub-lens system of the imaging system, the first sub-lens system having such a power and position that it image a medium area of the first kind on a first region of the detection system, and the second sub-lens system having such a power and position that it image a medium area of the second kind on a second region of the detection system.

Each sub-lens system can now be optimally adapted to the object it has to image and no movement of the imaging system is required. The images of the individual dot and of the print line portion can then be evaluated simultaneously.

Especially for monitoring an individual dot, it is essential that the recording medium, or print paper, remains in the focal plane of the imaging system or of the sub-lens system which images the dot. In practice, it has been found that, during the printing procedure, the medium, at the position of the module, may wobble over a range of +0,5 mm to –0,5 mm relative to the nominal plane of said medium. A lens system with which a dot can be measured at an accuracy of ±10 µm and fits in the small module, i.e. having a sufficiently small object-to-image distance, has a depth of focus which is smaller than said wobble range. An embodiment of the module which provides a solution to the important problem of the wobbling medium is characterized in that it is provided with an auto-focus system comprising a focus error detection system coupled to a focus correcting actuator.

The auto-focus system ensures that optics the medium is in focus in the field of view of the imaging.

The embodiment of the module wherein the selection between imaging an individual dot or imaging a print line portion is made by moving the imaging system may be further characterized in that the focus-correcting actuator is an actuator for fine-positioning the imaging along its axis.

In this embodiment, also a signal from the focus error detection system may be supplied to the actuator for selecting the imaging mode, so that this actuator performs two functions: selecting the imaging mode, i.e. imaging an individual dot or imaging a print line portion, and tuning the focus.

Alternatively, the module may be further characterized in that the focus-correcting actuator is an actuator for positioning a holder, accommodating all optical elements of the module, relative to the medium in a direction perpendicular to the medium.

The holder actuator can be used not only with the module wherein the imaging system comprises two fixed sub-lens systems, but also in the module with an undivided, movable, imaging system, although focus tuning by the lens actuator is preferred for the latter module.

The module with a holder actuator may be further characterized in that the actuator is constituted by a motor forming part of the module and having a cam wheel which is sustained by a ridge on a back plate, which plate is to be mounted on the carriage.

Upon rotation of the motor, the motor together with the holder is displaced axially. This actuator construction becomes possible because the module is compact and has a low mass.

Several methods and devices may be used for detecting the focus error. The different embodiments of the module are preferably characterized in that the focus error detection system comprises a portion of the radiation-sensitive system and an electronic processing circuit which is coupled to said portion to process and analyze the signals from the detector elements of said portion in order to determine for which position of the axially movable element the image of a feature of the medium has maximum contrast and/or minimum size.

The module may be used in a monochrome printer, but provides an even greater advantage when used in a colour printer because it then enables the colour of an individual dot to be controlled. The module for this purpose is characterized in that the radiation-sensitive detection system comprises a colour beam splitter for splitting radiation incident thereon into radiation of different colours and further comprises a corresponding number of sets of detector elements, each set being intended to receive radiation of one of said different colours radiation's.

An alternative embodiment of the module for the same purpose is characterized in that a separate colour filter is arranged in front of each detector element of the radiation-sensitive detection system, the colour filters for neighboring detector elements transmitting radiation of different colours.

No separate colour separating element is needed in this embodiment of the module.

If only the presence of the different print colour component: cyan, magenta, yellow and black in the print needs to be controlled, i.e. if it is only to be checked whether the nozzles for the different ink colours indeed eject ink, the radiation source of the illumination system needs to emit radiation of one wavelength band, provided that radiation of this wavelength is sufficiently absorbed by the printed colour dots. It has been found that a light-emitting diode (LED) having a central wavelength of 430 nm is suitable for this purpose. If not only the presence of print colour components, but also the colour composition of printed dots, i.e. the relative amount of print colour components, is to be controlled, a radiation source should be used that supplies radiation comprising colour components which are absorbed most by the cyan, magenta, yellow and black components of the dot. Such a source may be a single source, for example, a small lamp which emits white light.

Preferably, however, the module is further characterized in that the illumination system comprises at least one set of different light-emitting diodes each emitting radiation of a different colour.

Light-emitting diodes, or LEDs have proved to be reliable radiation sources which may be small and cheap and are available for different colours. In practice, the radiation source of the module will comprise a set of three different LEDs emitting the primary colours red, green and blue. Under circumstances, for example, when a higher intensity for the monitoring radiation is required and sufficient room is available, two or more sets of such LEDs may be used.

The LEDs can be switched on simultaneously and the different print colour components are then detected simultaneously. It is also possible to switch on the LEDs successively and to detect the print colour components successively. In the latter case the same detector elements can be used to detect the different print colour components, so that fewer detector elements are needed than in the case where these colour components are detected simultaneously.

If the solid angle of the radiation emitted by the radiation source is not too large, the radiation source may directly illuminate the printing medium. For example, the LEDs may be provided with lens elements which constrict the emitted radiation.

Preferably, however, the module is characterized in that the illumination system comprises a convergent lens system.

Such a lens system concentrates a maximum amount of the source radiation on a limited area of the printing medium so that the source radiation is used efficiently.

The module is preferably further characterized in that the illumination system comprises a cylindrical lens to form an elongated illumination spot on the medium, the longitudinal direction of the spot being parallel to the direction of a print line.

Such a shape and orientation of the illumination spot fits best for the purpose of the module.

The invention also relates to a dot printer for writing an image on a recording medium by exposing the medium on a dot-by-dot basis and comprising:
  a communication channel for carrying an information signal representing the image to be printed;
  at least one writing device coupled to the communication channel and modulated by the information signal for producing dots on the recording medium, together composing the image;

a carriage for carrying the writing device for producing a relative movement between the recording medium and the writing device, and a calibration instrument, fixed to the carriage, to read the printed dots and adjust printer settings. This dot printer is characterized in that the calibration instrument comprises a module as described hereinbefore.

The invention further relates to a method of printing information in the form of dots on a printing medium, comprising the steps of:

supplying the information to be printed to a dot printer;
printing a test pattern on the medium;
optically detecting the test pattern;
comparing the test pattern with a reference;
adapting printer settings if a deviation between the reference and the test pattern is detected, and
printing the information supplied to the printer.

This method is characterized in that the step of detecting the test pattern comprises detecting the gray scale of a test print line and detecting the size of at least one individual test dot.

This method ensures a high print quality, also with consumer printers.

This method is preferably characterized in that the step of detecting the test pattern also comprises detecting the colour of a test dot.

The method may be further characterized in that the step of printing a test pattern comprises printing a first portion of the information to be printed.

If dots and print line portions of the print image itself are used for testing, the time required for the calibration process is minimum.

These and other aspects of the invention are apparent from and will be elucidated, by way of non-limitative example, with reference to the embodiments described hereinafter.

Figures 4A, 4B:
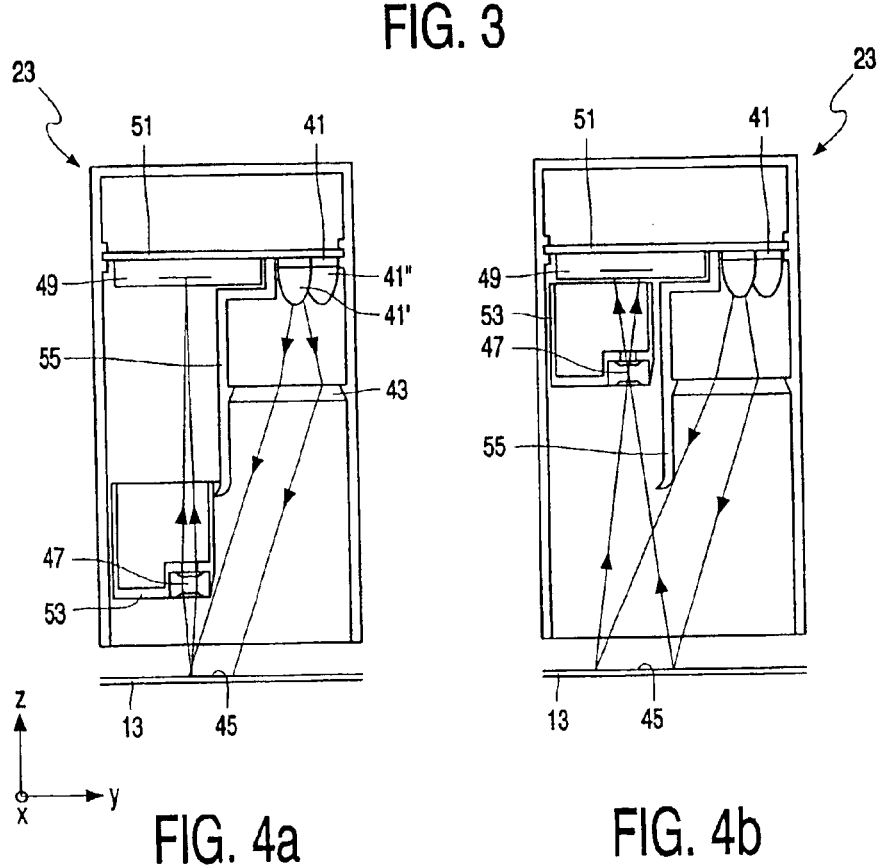
Figure 5:
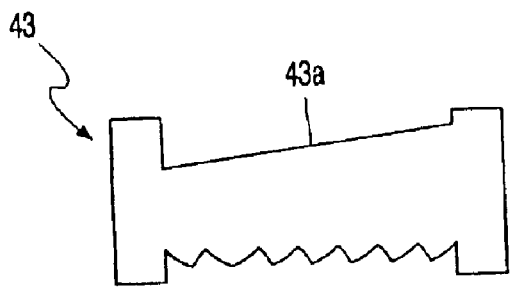
Figure 6:
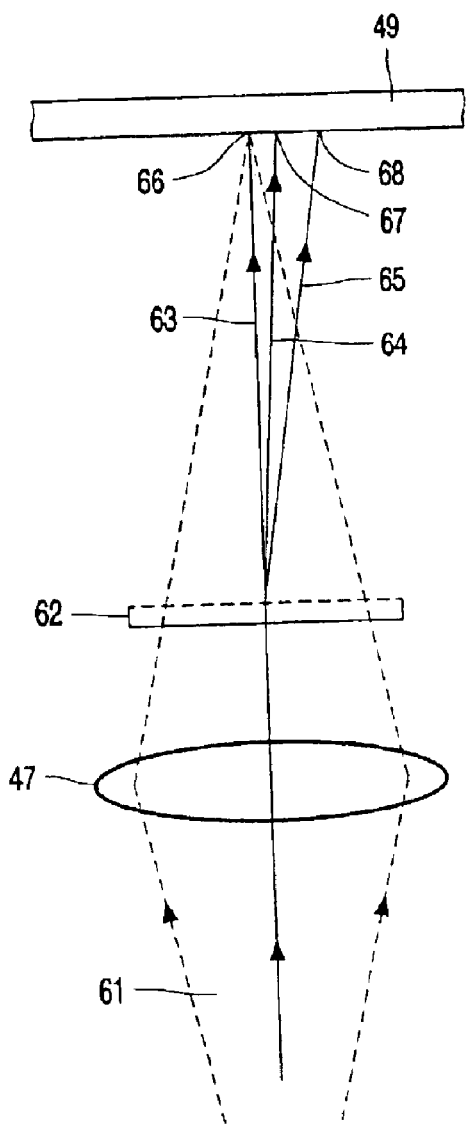
Figure 7:
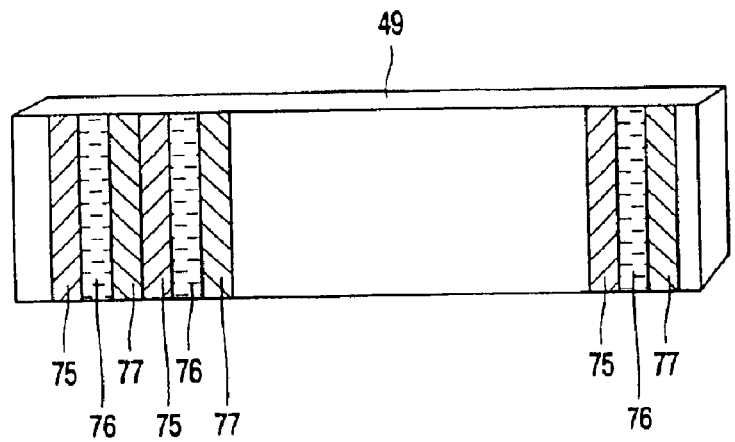
Figures 8A, 8B:
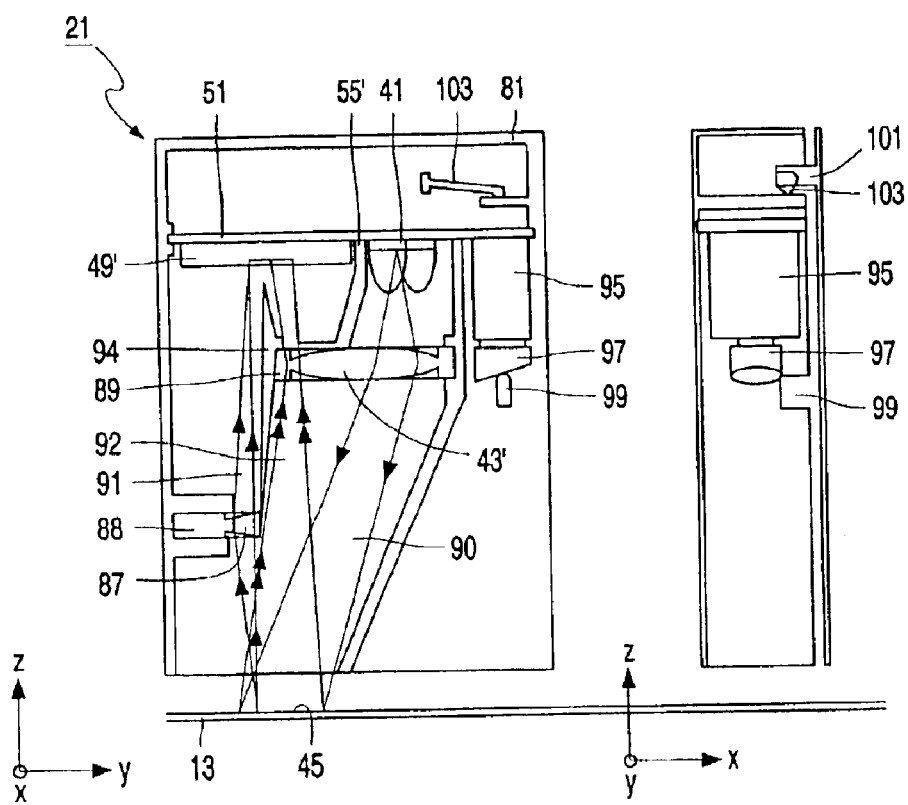
Figure 9:
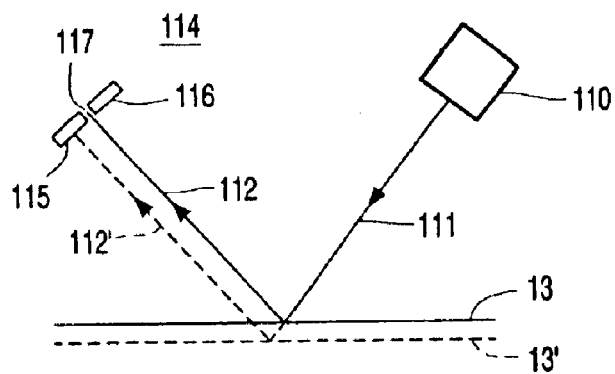
Figure 10:
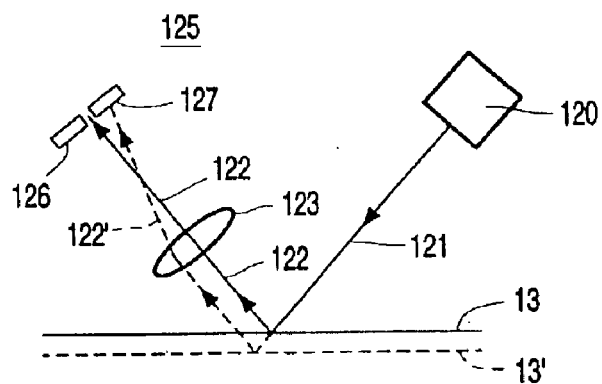
Figure 11:
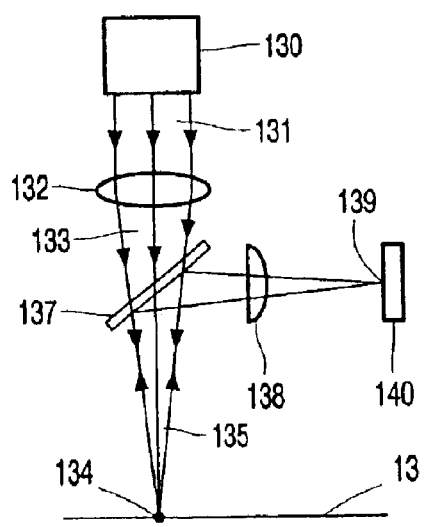
Figure 12:
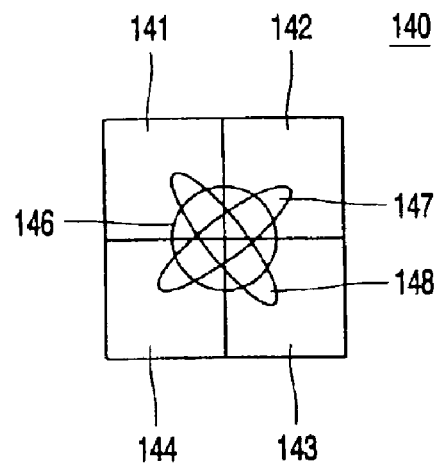

FIGS. 4*a* and 4*b* show a first embodiment of the monitoring module set in a dot monitoring mode and in a print line monitoring mode, respectively;

FIG. 5 shows an embodiment of a convergent lens system of this module;

FIG. 6 shows a part of an embodiment of the module for colour detection;

FIG. 7 shows a linear detector array provided with colour filters for this module;

FIGS. 8*a* and 8*b* show a first and a second cross-section of a second embodiment of the module;

FIG. 9 shows a first embodiment of a focus error detection system for use with the module;

FIG. 10 shows a second embodiment of the focus error detection system;

FIG. 11 shows a third embodiment of the focus error detection system;

FIG. 12 shows a front view of the detector in this embodiment, and

Figure 13A:
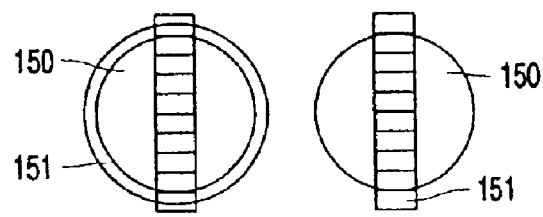
Figure 13B:
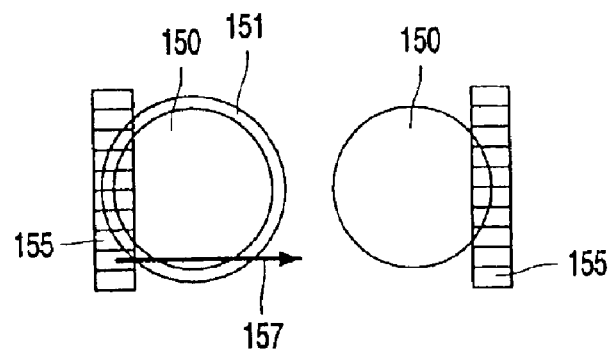

FIGS. 13*a* and 13*b* illustrate a preferred embodiment of a focus error detection method.

Figure 1:
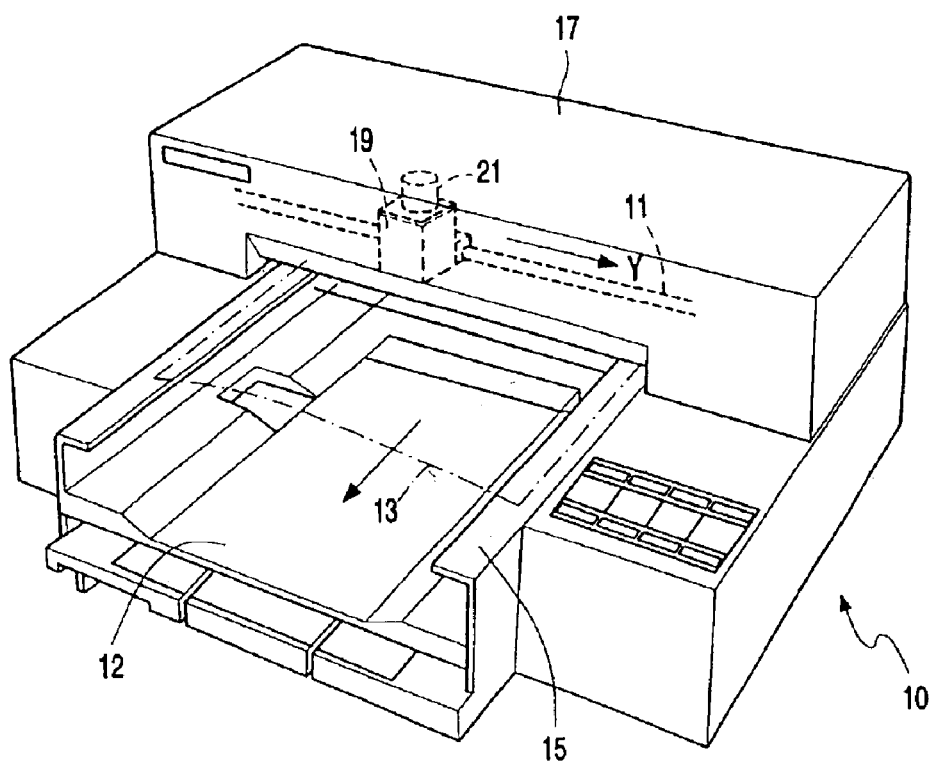
FIG. 1 shows a view of an embodiment of an inkjet printer.

FIG. 1 shows an embodiment of an inkjet printer 10, known from EP-A 0,641.115. This printer has an internal frame which includes a transverse rod 11, extending in an Y direction. The internal frame defines a print media path 12 through which the print media passes in the X direction. A sheet of print paper 13 is shown passing through the print media path suspended on paper rails 14 and 15. The means for moving the paper through the print media path are well known and not shown in FIG. 1. The internal frame is encased by an enclosure 17.

Mounted on the internal frame is a carriage 19 which houses a writing device, or inkjet cartridge, 21. The means for moving the carriage 19 in the Y-direction are not shown. These means are also well-known in the art. Usually, the print paper in an inkjet printer is displaced in the X direction whenever the carriage has finished one pass over the paper in the Y direction. The extent of displacement of the print paper is determined by the x dimension of the area covered by the cartridge 21. The inkjet cartridge contains a reservoir of ink and a print head containing the ink-jetting mechanism. The print head comprises a number of individual nozzles arranged, for example, in two or three columns, through which the ink is ejected onto the print paper area. The cartridge also comprises a flexible circuit interconnection through which the printer electronics (not shown) selectively activates each nozzle so that this nozzle ejects a drop of ink.

Each nozzle will only eject ink when a drop is needed at a pre-determined position on the print paper. The Y position of the print head with respect to the paper is controlled by the cartridge transport mechanism. To determine the position of the cartridge, and thus of the print head, the carriage is provided with a position sensor, for example, an optical sensor that moves along a scaled strip of the internal frame.

The nozzles can eject several ink drops on approximately the same position. These drops blend together into an ink strain, called a dot. The dot is considered as the smallest print unit. The size of such a dot depends on the amount of ejected ink. If all nozzles eject black ink, a black dot is formed on the print paper. To obtain a colour dot, the ink head should contain nozzles of different kinds whereby each kind ejects a different ink colour. By blending drops of different colours, a dot having one specific colour from a large range of colours is obtained. The colour of such a dot is determined by the number of drops of each ejected colour. In practice, a sufficiently large gamma of colours is obtained with three ink colours cyan, magenta, yellow, and with black. The printer may comprise one cartidge for printing in black and one cartridge for colour printing, in which can both cartridges are mounted on the same carriage. The printer may also be provided with only one cartridge which comprises both black ejecting nozzles and colour ejecting nozzles, so that both black prints and colour prints may be produced by the same cartridge. Alternatively, four cartridges, ejecting black, cyan, magenta and yellow ink, respectively, may be used. This may be advantageous when it is expected that more ink of one or more colours will be used than ink of the other colours.

There is a need to measure the quality of prints produced by such inkjet printers and by printers of another kind such as laser printers or thermal printers. Such a measurement can be performed during a test printing procedure and before recording the desired image, so that the writing device can be calibrated using the results of the measurement of the test print. Preferably, however, the measurements are also carried out during printing features, which enables deviations to be detected immediately after the features have been printed, so that, for example, printing can be stopped at an early stage when such deviations occur and ink, time and paper can be saved.

Figure 2:
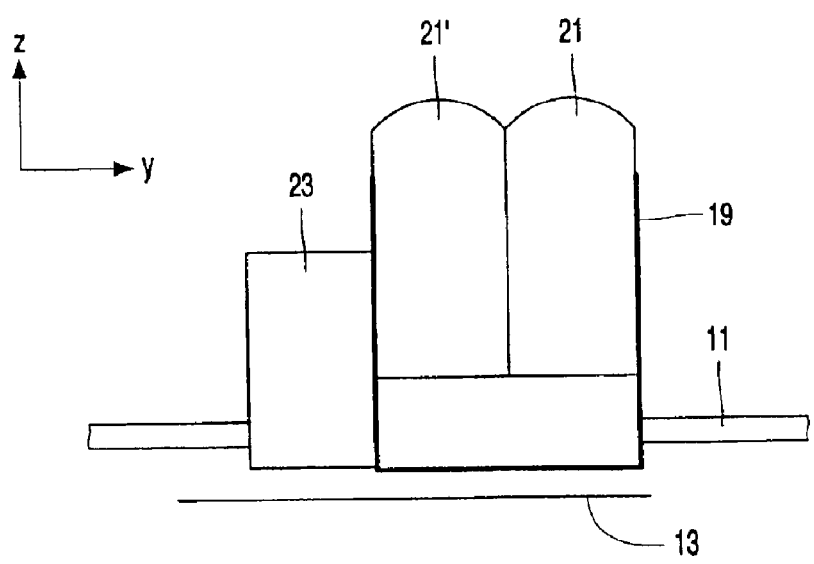
FIG. 2 shows a carriage for the cartridge for this printer provided with a monitoring module.

Said measurement can be carried out by an optical module having such small dimensions and mass that it can be fixed to the carriage for the cartridge so that it can be moved together with said carriage. FIG. 2 shows a front view of the carriage 19 with the monitoring module 23. The carriage may be designed to accommodate either one cartridge or, as shown in FIG. 2, two cartridges 21,21'. The module may be arranged in such a way that it trails the cartridge(s), thus at the left side of the cartridge(s) if, during printing, the carriage moves to the right. This will be the case if monitoring is carried out continuously and immediately after printing or if, after printing a line, the carriage has been moved back to the left, monitoring is carried out during the next movement to the right. If monitoring is carried out after a line has been printed and during the backward movement of the carriage to the left, the module is arranged at the right side of the cartridge(s). The module is at the same level of the printing medium, or paper, as the cartridge(s). Thus the monitor can observe printed features during printing of a print line or after such a line has been printed.

Figure 3:
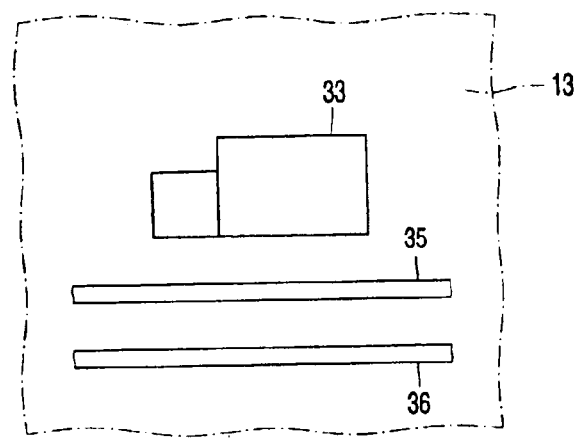
FIG. 3 shows a portion of a printing medium provided with print lines and the footprint of the cartridge and the module.

FIG. 3 shows a footprint 33 of the cartridges and monitoring module, i.e. the projection of these elements, on a portion of the print paper 13 and two print lines 35 and 36 on this paper. A print line is the stroke of the printing medium that is scanned and printed by the ink head in one go, from left to right. In practice, such a print line has a maximum width of, for example 12.5 mm. The module comprises a radiation source and a first, condenser, lens system by means of which an area of a print line is illuminated. This area is imaged by a second, imaging, lens system on a radiation-sensitive detection system, hereinafter called detector. A monitor that illuminates an area which is smaller than the width of a print line with one colour and comprises a single detector element has the capabilities of detecting the gray scale of a printed area and detecting the paper edges. By looking at the gray scale of, or density in, the illuminated area, it can be established whether one of the cartridges does not eject ink, by detecting whether ink is missing at a position where it should be. However, this is only possible if the radiation emitted by the radiation source has such a wavelength that it is sufficiently absorbed by the ink. By determining the edges of the paper, it can be established whether the paper fed into the printer has the required size and whether this paper is fed through the printer in a correct way. With such a monitor, having a small field of view relative to the width of a print line, only a small portion of the print line width can be scanned and only relatively large deviations are detected.

The present invention provides a monitoring module that has more capabilities and enables finer measurements to be made. This module comprises a radiation-sensitive detection system composed of a large number of detector elements and an imaging lens system that enables the illuminated printing medium area, or portions thereof, to be imaged on the detection system in two different magnifications. In the first magnification, a medium area with a dimension of the order of that of a dot is imaged on the detection system, whereby the dot image covers several of the individual detector elements, so that it becomes possible to determine the quality of an individual printed spot. In the second magnification, the whole illuminated area or a considerable portion thereof is imaged on the detection system, so that also gray scale measurement and printing medium edge detection remains possible. The detection system may comprise a, for example linear, CCD array.

FIG. 4a shows a cross-section of a first embodiment of the monitor module. In this FIG., element 41 is a radiation source, which is preferably a white source and is most preferably composed of at least one set of three light-emitting diodes (LEDs) which emit red blue and green light, respectively. FIG. 4a shows only two LEDs 41', 41" of a set of three. The radiation source is adapted to the kind of monitoring to be carried out. For example, the number of differently coloured LEDs depends on the colours to be detected. If the radiation emitted by the source 41 has a solid angle that is not too large, this source may directly illuminate the printing medium 13. When using LEDs for illumination, they may be provided with lens elements which constrict the emitted radiation. Preferably, the monitor comprises a converging lens 43 which converges the light from the source 41 on the printing medium so that only an area 45 having a pre-determined size of the medium 13 is illuminated. The converging lens also prevents to a certain degree that radiation which does not come from the print area to be observed reaches the detection system 49. Element 47 is an imaging lens system which images the illuminated area on the detection system 49. This system is, for example a linear CCD array. The imaging lens system is, for example, a refractive lens having either two aspherical surfaces or one or two aspherical surfaces. The lens material may be glass, but is preferably made of a transparent plastics material, like PMMA (polymethyl methacrylate) or PC (polycarbonate). Such a lens element can be mass-produced at low cost by means of well-known replication techniques. The imaging lens may also be a Fresnel lens or a diffractive element, which lens and element can also be mass-produced at low cost.

To ascertain that the illuminated area is in the field of view of the detection path, comprising the imaging lens 47 and the detection system 49, the radiation from the source should not only be converged, but also bend toward the left. To that end, an optical wedge could be inserted in the illumination path from the radiation source to the printing medium. The lens 43 may be a refractive lens having two spherical surfaces, one spherical and one aspherical surface or two aspherical surfaces. The lens 43 may also be a Fresnel lens or a diffractive element. Also in an embodiment wherein the radiation source directly illuminates the printing medium an optical wedge may be inserted between the radiation source and the printing medium for binding the source radiation towards the print area to be observed.

FIG. 5 shows a preferred embodiment of the first lens system 43. It consists of one element having a wedge-shaped upper side 43a and a Fresnel structure 43b at its underside. Also this lens element may be made of glass, but preferably of PMMA or PC.

The multi-element detector and the LEDs are preferably mounted on a common printed circuit board (PCB) 51 which comprises circuits for supplying and switching the LEDs and for reading out the detector elements and transporting the information signals to a central processing unit of the printer. In this unit, the signals from the detector are compared with reference signals, and control signals are generated for the printer settings.

A cylindrical lens is having its cylindrical axis in the X direction is arranged in front of the LEDs, or another radiation source, so that an elongated area of the printing medium is illuminated whereby the longitudinal direction of the area is in the transversal direction of a print line. The illumination path is designed in such a way that the illuminated area has a dimension of the order of 12.5×0.085 mm, which means that the illuminated area covers the whole width of a print line over a length of the order of one dot size. By scanning this illuminated area over the medium by means of the carriage 19, a full print is scanned and successively imaged on the composed detector 49.

In the embodiment of FIGS. 4a and 4b, the selection between the modes of imaging the whole illuminated area and imaging only a portion having a size of the order of that of a dot is made by positioning the single imaging lens 47 in one of two axially different positions. This lens is accommodated in a holder 53 which can be moved by well-known actuator, or motor, means. In the mode depicted in FIG. 4a, the lens 47 is in a first, low, axial position close to the printing medium 13. In this position, the lens 47 observes only an area of the order of a single dot and images this area on the composed detector 49 with a high resolution. The resolution is the ability of a lens system to reproduce points, lines etc. in an object as separate entities in an image. The resolution in the first mode of FIG. 4a is considerably larger than is needed to discriminate between individual dots, so that the size and shape of an individual dot can be determined in this mode.

In the second mode illustrated in FIG. 4b, the lens 47 is in a second, high, position, most remote from the printing medium. In this position, the lens observes and images the whole print line width on the composed detector with a resolution that is lower and such that individual dots cannot be resolved. However, this mode is very suitable for measuring the intensity, or gray scale of a print line and the left and right edge of the printing medium.

In order to prevent that radiation from the radiation source, not reflected at the illuminated area, reaches the detector, a radiation shield 55 may be provided in the module, as shown in FIGS. 4a, 4b.

In the above-mentioned first mode, not only the size and shape of an individual dot, but also the colour of such a dot can be determined. For spot size and spot shape determination, a radiation source emitting radiation of a single colour or colour band will do. However, for determining the colour, a radiation source should be used which emits radiation having a colour spectrum that covers the printer colours cyan, magenta, yellow and black. Such radiation is, for example, emitted by a white light source. Such a white light source is preferably composed of a red, green and blue LED. These LEDs may be switched on simultaneously or sequentially.

When all LEDs are activated simultaneously, the printing medium is illuminated with white light and simultaneous colour scanning becomes possible. A colour-separating element, such as a prism or a diffraction grating, is arranged in the detection path to divide the white light beam reflected from the illuminated area into three differently coloured sub-beams. These sub-beams have such different directions of propagation that they are incident on different elements of the composed detector 49. Each object pixel is then imaged on three detector elements. The colour-separating element is preferably arranged between the imaging lens 47 and the detector 49. Three additional lenses may be arranged in front of this detector to direct and concentrate the sub-beams with different colours on their associated detector elements.

This is illustrated in FIG. 6, which shows only the portion of the detection path between the imaging lens 47 and the detection system 49. The white imaging beam 61, which is focused by the imaging lens 47 in the plane of the detection system, passes through a diffraction grating 62. This grating diffracts the red, green and blue components of the white imaging beam 61 through different diffraction angles, so that the white beam 61 is divided into three differently coloured sub-beams 63, 64 and 65, the chief rays of which are incident on different detector elements 66, 67 and 68, respectively. Also the other corresponding rays of the sub-beams 63, 64 and 65 are incident on different detector elements. To improve the imaging quality of the module an additional lens may be arranged between the diffraction grating 62 and the detection system 49.

The simultaneous colour scanning embodiment of the module enables the colour of the dots of a print line to be determined in one scan of the module over this print line.

An alternative to the simultaneous colour scanning embodiment is the sequential colour scanning embodiment. In the latter embodiment, the printing medium is successively illuminated by red, green and blue light by activating the red, green and blue LEDs, respectively. The illumination beams of the three LEDs are now successively projected on the same illumination area. The reflected light beams with different colours are now successively projected on the same detector elements, so that the number of detector elements needs to be only ⅓ of the number of detector elements in the simultaneous colour scanning embodiment. To determine the colour of the dots of a print line, this line has to be scanned three times. By using a suitable detection system and suitable LEDs, a very acceptable total scanning time can be obtained. Compared with the simultaneous colour-scanning embodiment, the sequential colour-canning embodiment has the advantages that it has a simpler construction and that no measures have to be taken to prevent the lights of the different colours from being mixed.

For imaging the small object pixels, i.e. portions of a dot, having a size of, for example 10×10 μm, the imaging lens should have a high resolution. The resolution is proportional to the numerical aperture, NA, of the lens. As the depth of focus of the lens is inversely proportional to $NA^2$, a lens with a high resolution has a small depth of focus. An object can be imaged sharply only if it remains within the depth of focus of the imaging lens. However, in practice, the level of the printing medium at the location of the monitoring module can vary between +0,5 mm and −0,5 mm relative to the nominal level, if no additional measures are taken. This range is larger than the depth of focus of the imaging lens, which means that object pixels of said dimension can no longer be resolved, i.e. imaged separately. In order to avoid this, the module is preferably provided with an auto-focus system ensuring that the optimum distance between the imaging lens and the printing medium is continuously maintained.

Although it is not a must, the auto focus system is an important novel and inventive aspect of the present invention, because it provides a very attractive solution to a new problem.

The auto-focus system comprises a focus error detection system for detecting a deviation between the object plane of the imaging lens 47 and the plane of the printing medium 13 and correcting means coupled to the focus error system to such a deviation or eliminate reduce it to an acceptable level.

For the embodiment of FIGS. 4a and 4b. the most attractive way of eliminating or reducing the deviation is to displace the detector 49 or the imaging lens 47 axially. Displacement of the lens is preferred because it is not connected to other elements. The actuator needed to realize the displacement may be, for example, a piezo-electric actuator or a motor. A motor is preferred because it is cheaper than a piezo-electric actuator and still meets the requirements with respect to accuracy of movement and response time. The motor may be a linear motor or a rotational motor. A linear motor has the advantages that it drives the object to be moved with high precision at large velocities and large accelerations and has a high reliability and a long lifetime. A rotational motor requires a transmission to convert the rotational movement into a linear movement. However, this motor is more compact than a linear motor and, because it is a standard product, it is cheaper than a linear motor. The latter aspect is important for a mass-, or consumer, product, which the printer and thus the module is intended to be. As, moreover, a rotational motor has a sufficient performance for the present job, it is preferred to use this kind of motor. There are several options to convert the rotational movement of the motor into a linear movement of the lens. For example, the motor may be provided with a cog, an eccentric wheel, a cam wheel or a worm gear or use may be made of friction between a round motor wheel and the object to be displaced.

With respect to the auto-focus aspect, the embodiment of FIGS. 4a and 4b has the advantage that, for correcting focus errors, only the small and light lens element 47 needs to be moved, which allows a fast response to focus errors and a continuous correct setting of the module. Moreover, the same actuator, or motor, can be used for moving the imaging lens 47 between the first axial position (FIG. 4a) as well as the second axial position (FIG. 4b) and for correcting focus errors.

FIG. 8a shows a first cross-section of a second embodiment of the monitoring module. This module comprises the same radiation source 41, preferably three LEDs and a similar detection system 47' and a common PCB 51 for the LEDs and the detector. This module has the capability to image both a dot and the width of a print line simultaneously on separate portions of the composed detector. The imaging system is divided into two subsystems, each comprising a lens 87 and 89, respectively. These lenses have fixed positions and different magnifications. The lens 87 performs a similar function as lens 47 in the mode of FIG. 4a, namely imaging, by means of beam 91, a printing medium area with a size of the order of one dot on the left portion of the detection system. The lens 87 and its holder 88 are fixed to a side wall of the module enclosure 81. The lens 89, also at a fixed position, performs a similar function as lens 47 in the mode of FIG. 4b. It images, by means of beam 92, a medium area having a dimension of the order of the width of a print line in one direction and a dimension of the order of one dot in the other direction on the right portion of the detection system 47'. It should be ensured that the beam 92 is incident on the detection system 47' at another position than the beam 91. To that end, the lens 89 may have a wedge shape so that it deflects the beam 92 away from the beam 91.

The illuminated area 45 may be the same as that in FIG. 4a and the condenser lens 43' may have the same lens power and deflection power as the lens 43 in FIG. 4a. As shown in FIG. 8a, the lens 43' may have a wedge structure. The lens 43' may also be a normal spherical or aspherical lens which is arranged in such a way that the illumination beam 90 passes excentrically through this lens, so that the beam is deflected. This also holds for the condensor lens 43 in the embodiment of FIG. 4a. The imaging lens 89 is preferably designed in such a way that it can be arranged at the same Z position as the condensor lens 43', so that these two lenses can be integrated into one lens element, as shown in FIG. 8a. This lens body, or the separate lenses 89 and 43' may be made of PMMA or PC and can be mass-produced at low cost by means of well-known replication techniques. This also holds for the lens 87, which may also be made of PMMA or PC.

Also in the embodiment of FIG. 8a, a light shield 55' may be provided to prevent radiation from the source 41 and not reflected at the illuminated area 45 from reaching the detector 49'. Because of the different construction of the module of FIG. 8a, this light shield has a shape and dimension which are different from those of the shield 55 in the module of FIG. 4a. The module of FIG. 8a preferably comprises a second light shield 94 arranged between the paths of the imaging beams 91 and 92 to prevent radiation of any of these beams from reaching a detector portion which is intended for the other beam.

The lens 87 images on the detection system only a medium area of the order of one dot with a resolution of, for example 10 $\mu$m. A resolution of 10 $\mu$m means that object details spaced 10 $\mu$m apart can be separately imaged and detected by an adapted detector. This dimension is considerably smaller than the average dot diameter, which is, for example of the order of 100 $\mu$m, and also smaller than the smallest dot diameter which is, for example of the order of 75 $\mu$m. The detection system 49', preferably a CCD sensor, should be adapted to the required resolution and the geometric distances between the medium and the lens 87 and between this lens and the detector. Moreover, the module should be as small as possible. Said distances are mainly determined by the magnification M of the lens 87. This magnification is the ratio between the size of the object pixels, i.e. picture elements, and the size of the detector pixels, i.e. detector elements. For a practical embodiment, the most suitable distances are obtained for a magnification M=1.3 and a size of 13×13 $\mu$m for a detector element. For measuring the size and colour of a single dot, it is sufficient to image a medium area of 300×300 $\mu$m. For a resolution of 10 $\mu$m, 30 pixels of a linear detector array are then needed for this measurement. To measure a print line throughout its width, a resolution of the order of 80 $\mu$m is sufficient. For a print line width of 12.5 mm, the required number of detector pixels is of the order of 150. Of the available linear CCD arrays, an array with 256 pixels is most suitable for the present purpose. 150 of these pixels, in the centre and at the right side of the array, are used to measure the print line, and 30 pixels at the left size are used to measure a dot. The remaining pixels, about 70 in number, between the area of the dot measuring pixels and the area of the line measuring pixels form a neutral, i.e. unread, area which prevents cross-talk between the measurements.

Auto-focus is carried out with the module of FIG. 8a by moving the whole module, thus also the lenses 87 and 89, in the axial, or Z-, direction relative to a back plate which is mounted on the carriage. The range of this movement is, for example from +0,5 mm to –0,5 mm relative to the nominal position. This movement can be realized, for example, by a rotational DC motor 95 which has an eccentric, or cam, wheel 97. A ridge 99 of a back plate 101, shown in FIG. 8b supports this wheel. FIG. 8b shows a cross-section of the module at the position of the motor and along a plane perpendicular to the plane of cross-section of FIG. 8a. To ensure that the cam wheel always contacts the ridge, a spring element 103 which is integrated with the back plate 101 exerts a downward force on the motor 95. If the wheel 97 rotates from its nominal position in one direction, the motor and the module move upwards and if the wheel rotates in the opposite direction, the motor and the module move downwards.

For automatic adaptation of the height, or Z, position of the module of FIG. 8a, or this position of the imaging lens 47 in the module of FIG. 4a, the motor 95 for the module or the motor for said lens should be supplied with a focus error signal. This signal, which represents a deviation between the plane of focus of the imaging lens and the plane of the printing medium at the location of the module can be obtained in several ways.

A first method of generating a focus error signal is the triangulation method. FIG. 9 shows the basic device for performing this method. This device comprises a radiation source 110, additional to the source 41 in FIGS. 4a and 4b. The source 110 supplies a focus detection beam 11 which is incident on the printing medium 13 at an acute angle and is reflected by the medium as beam 112. A radiation-sensitive detector 114, comprising two detector elements 115 and 116 separated by a strip 117, is arranged in the path of the reflected beam 112. The focus detection device is designed in such a way that, if the printing medium is in focus, as indicated by the solid line 13, a spot formed by the reflected focus beam 112 in the plane of the detector 114 is symmetric relative to the separating strip 117. If the medium drifts from the focal plane, as indicated by the broken line 13', the reflected beam 112 is displaced parallel to itself, as indicated by the beam 112'. Then the spot formed in the detector plane moves over the detector elements, so that one of these elements receives more radiation than the other. By measuring the difference of the signals from the detector elements, the extent and sign of a focus error can be determined.

A second method of generating a focus error signal is the skew beam method. FIG. 10 shows the basic device for performing this method. This device comprises a radiation source 120 which supplies a, for example collimated, focus detection beam 121. This beam is incident on the printing medium 13 at an acute angle and is reflected by the medium as beam 122 towards a radiation-sensitive detector 125. A lens 123 which focuses the beam 122 in the plane of the detector is arranged between the medium 13 and the detector 125. The detector 125 comprises two detector elements 125 and 125, separated by a strip 127. The device is designed in such a way that, if the printing medium is in focus, as indicated by the solid line 13, the beam 122 incident on the detector is symmetric with respect to the separating strip, so that the two detectors receive the same amount of radiation. If the medium shifts from the focal plane, as indicated by the broken line 13', the reflected beam shifts parallel to itself and the position, from the lens axis, where the chief ray of this beam enters the lens 123 shifts. The chief ray is then refracted by the lens, as indicated by the interrupted ray 122' and is incident on one of the detector elements, so that this element receives more radiation than the other detector element. By measuring the difference of the signals from the detector elements, the extent and sign of a focus error can be determined.

Still another focus error detection method is the astigmatic method. FIG. 11 shows the basic device for performing this method. This device comprises a radiation source 130 which supplies a, for example collimated, focus detection beam 131. This beam passes through a focusing lens 132 which converts the beam 131 into a convergent beam 133 and focuses beam 133 into a spot 134 on the information medium 13. This medium reflects a part of the beam 133 as reflected beam 135. Arranged between the focusing lens 134 and the medium 13 is a beam splitter, for example a semi-transparent mirror 137 or a beam-splitting prism, which transmits a part of the beam 133 and reflects a part of the beam 135 towards a detector 140. The spot 134 on the medium is re-imaged in a spot 139 on the detector 140. An astigmatic element, for example a cylindrical lens 138 is arranged in the path of the reflected beam 135. The effect of the astigmatic element is that a point of the medium 13 is no longer imaged in one focal point, but in two astigmatic focal lines which are shifted with respect to each other along the axis of the beam 135. Upon a shift of the medium 13 in the direction of the axis of the beam 133, the astigmatic focal lines of the beam shift along the axis of the beam 135, and thus also with respect to the plane of the detector 140. FIG. 12 shows a front view of the detector 140 with the spot formed on this detector 140. The detector comprises four detector elements 141, 142, 143 and 144 and is usually called a quadrant detector. The detector 140 is placed between the astigmatic focal lines. The device is designed in such a way that, if the medium is in the focal plane of the lens 132, the plane of the detector is midway between the astigmatic lines, i.e. the distance between one astigmatic line, before the detector plane, is equal to the distance between the other astigmatic line, behind the detector, and the detector plane. In this situation, the spot formed on the detector is a round spot and the four detector elements receive the same amount of radiation. If the printing medium 13 shifts with respect to said nominal position, the spot on the detector deforms to an elliptical spot with the longitudinal direction at +45°, spot 147, or at −45°, spot 148. If spot 147 is formed, the detector elements 142 and 144 receive more information than the detector elements 141 and 143. If spot 148 is formed, the detector elements 142 and 144 receive less radiation than the detector elements 141 and 143. By adding the signals from the detector elements 141 and 143 and the signals from the detector elements 142 and 144 and subtracting the obtained sum signals, the extent and sign of a shift of the printing medium 13 with respect to the focal plane of the lens 132 is obtained.

The focus error detection methods described above require additional elements to be arranged in the module. Together with the detection system only the focus detector elements may be integrated into one composed detection system for determining the print quality. Said additional elements are not needed if use is made of a focus error detection method which searches for the smallest dimension and highest contrast of the image of a dot. For an optical system like the present, wherein the maximum dot size is smaller than 0.3 mm and the lens has a diameter of, for example 3 mm, thus in a system wherein the object is smaller than the lens diameter, the size of the image is minimum and the contrast is maximum for the in-focus state. If the system gets out of focus, the image will get larger and its contrast lower. This is illustrated in FIG. 13a which shows the image of a dot on the detector elements. The right side of this Figure shows the situation wherein the printing medium is in focus. The dimension of a dot image 150 is then minimum so that a minimum number of detector elements 155 is covered. The contrast is then maximum. The left side of FIG. 9a represents the situation in which the printing medium is out of focus. The size of the dot image has increased and the contrast has decreased, which is illustrated by the lighter ring 151 around the in-focus image 150. In the out-of-focus condition, a larger number of detector elements 155 is covered. By comparing the signals from the detector elements 155, the size and contrast of the dot image can be determined. The information of this measurement is used to control the focus-correcting motor, so that the size is maximum and the contrast minimum.

The measurement of the dot image size and contrast can be carried out on a small slice of the image, as shown in FIG. 13a, provided that the image is stationary with respect to the detector. This condition becomes necessary when the dot image has an irregular shape. It is therefore preferred to measure the whole image, which can be realized by moving the image and the detector relative to each other as illustrated by the arrow 157 in FIG. 13b. In FIGS. 13a and 13b, the same reference numerals represent the same elements.

The focus error detection system of FIG. 13a or 13b has the advantage that it can be implemented in the monitoring module without adding any additional element to the module. The size of the module with this focus error detection system is determined only by the design of the optical system for determining the size and colour of a dot, the gray scale of a print line and the edges of the printing medium. A practical embodiment of the module has a height of 25 mm, a width of 15 mm and a depth of 10 mm. This module is very suitable to be mounted on the carriage for the printing device(s).

Because of the measuring capabilities of the present module, a printer comprising this module has the unique feature of automatic adjustment of the printer settings to the characteristics of the printing medium used. A novel, improved print quality can be obtained by means of such a printer.

As said measurements cannot be carried out simultaneously, they should be done sequentially. A possible sequence for the measurements is as follows. After the printer has received a print instruction, it will feed a sheet of paper under the printing device. The monitoring module is positioned so as to detect the top of the paper as it passes through the printing device. The paper is transported further until it reaches the position for the first print line. The module checks whether the right side of the paper is aligned correctly relative to the printer. Then the printer prints several separate test dots, which are part of the image to be printed. The carriage moves until the module detects the left side of the paper. The width of this paper is then known by the printer. Then the carrier moves back. During this movement, the monitor measures the location, size and colour of the test dots. For each dot measurement, the printer positions the module above the dot and focuses on the dot, so that a sharp image of the dot is obtained. After the test dots have been measured, their average size, colour and positions are compared with stored reference values. If deviations occur, the settings of the printer are adapted and stored in the memory of the printer. In this way, the printer automatically aligns its cartridges and achieves maximum print quality for each medium type, medium colour and environmental condition. The printer is then ready to print the required information. The carriage moves back to its vertical start position and the carriage moves to the left whereby it scans the blank paper that is to be printed and checks whether the print line has not been printed already. If ink is detected, this could mean that the paper slips or the wrong paper, has been fed in in case of double sided printing. During scanning back by the carriage, the module controls a just printed line, and detects whether the dots are at the right position and together show the right gray scale. This informs the printer about the status of the cartridges. Whenever the module passes a paper edge during the print job, the position and orientation of the paper is controlled. The module possible detects the underside of the paper passing under the printing device. The length of the paper measured by means of the module is stored in the memory of the printer. If subsequent sheets of paper seem to be longer, the printer will check whether this is not due to more than one sheet of paper being fed in.

The invention has been elucidated with reference to an inkjet printer, but this does not mean that it can only be used in combination with such a printer. The invention can generally be used in any kind of dot printer which has controllable printer settings and prints optically detectable dots and print lines.

What is claimed is:

1. A module for monitoring the print quality of a dot printer, which monitor is to be fixed to a carriage for moving a printer device of the printer, said module comprising:
    an illumination system for supplying a monitoring radiation beam to illuminate an area of a printing medium;
    an imaging system for collecting monitoring radiation reflected by the illuminated area and forming an image in an image plane, and
    a radiation-sensitive detection system for converting said image into electric signals representing quality parameters of the print,
    characterized in that the detection system comprises at least a linear array of discrete detector elements, and in that means are provided for imaging, in the plane of the detector elements, both a medium area of a first kind, comprising a number of printed dots, and a medium area of a second kind, comprising one printed dot.

2. A module as claimed in claim 1, characterized in that said means for imaging comprised an actuator for positioning the imaging system in either one of two fixed positions along the axis of said imaging system.

3. A module as claimed in claim 1, characterized in that said means for imaging comprises a first and a second sub-lens system of the imaging system, the first sub-lens system having such a power and positioned that it images a medium area of the first kind on a first region of the detection system, and the second sub-lens system having such a power and positioned that it images a medium area of the second kind on a second region of the detection system.

4. A module as claimed in claim 1, characterized in that it is provided with an auto-focus system comprising a focus error detection system coupled to a focus correcting actuator.

5. A module as claimed in claim 4, characterized in that the focus-correcting actuator is an actuator for fine-positioning the imaging system along its axis.

6. A module as claimed in claim 4, characterized in that the focus-correcting actuator is an actuator for positioning a holder, accommodating all optical elements of the module, relative to the medium in a direction perpendicular to the medium.

7. A module as claimed in claim 6, characterized in that the actuator is constituted by a motor forming part of the module and having a cam wheel which is sustained by a ridge on a back plate, which plate is to be mounted on the carriage.

8. A module as claimed in claim 4, characterized in that the focus error detection system comprises a radiation source for supplying a focus detection beam, the chief ray of which is at an acute angle with a normal to the plane of the printing medium, and a radiation-sensitive detector, comprising two detector elements separated by a strip and arranged in the path of the focus detection beam reflected from the medium so that the cross-section of this beam in the plane of the detector is symmetrical with respect to the separating strip if the printing medium is in focus with the imaging system.

9. A module as claimed in claim 4, characterized in that the focus error detection system comprises a radiation source for supplying a focus detection beam, the chief ray of which is at an acute angle with a normal to the plane of a printing medium, and, successively arranged in the path of the focus detection beam reflected from the medium, a lens system and a radiation-sensitive focus detector, the detector comprising two detector elements separated by a strip and the lens system having a pupil which is larger than the cross-section of the reflected focus detection beam and being arranged so as to deflect this beam across over the focus detector if the printing medium shifts from the focal plane of the imaging system.

10. A module as claimed in claim 4, characterized in that the focus error detection system comprises a radiation source for supplying a focus detection beam, a focusing lens and a beam splitter successively arranged an the beam path between the radiation source and the plane of the printing medium, and an astigmatic element and a radiation sensitive focus detector successively arranged in the path of the focus detection beam reflected from the printing medium, the focus detector comprising four detector elements arranged in four different quadrants of an x-y coordinate system in the plane of the detector.

11. A module as claimed in claim 4, characterized in that the focus error detection system comprises a portion of the radiation-sensitive detection system and an electronic processing which is circuit coupled to said portion to process and analyze the signals from the detector elements of said portion in order to determine for which position of the axially movable element the image of a feature of the medium has maximum contrast and/or minimum size.

12. A module as claimed in claim 1, characterized in that the radiation-sensitive detection system comprises a colour beam splitter for splitting radiation incident thereon into radiation of different colours, and further comprises a corresponding number of different kinds of detector elements, each kind being sensitive to radiation of a different one of said colours.

13. A module as claimed in claim 1, characterized in that a separate colour filter is arranged, in front of each detector element of the radiation-sensitive detection system the colour filters for neighboring detector elements transmitting radiation of different colours.

14. A module as claimed in claim 1, characterized in that the illumination system comprises at least one set of different light-emitting diodes each emitting radiation of a different colour.

15. A module as claimed in claim 1, characterized in that the illumination system comprises a convergent lens system.

16. A module as claimed in claim 1, characterized in that the illumination system comprises a cylindrical lens to form an elongated illumination spot on the medium, the longitudinal direction of the spot being perpendicular to the direction of a print line.

17. A dot printer for writing an image on a recording medium by exposing the medium on a dot-by-dot basis and comprising:
- a communication channel for carrying an information signal representing the image to be printed
- at least one writing device coupled to the communication channel and modulated by the information signal for producing dots on the recording medium, together composing a printed image;
- a carriage for carrying the writing device for producing a relative movement between the recording medium and the writing device, and
- a calibration instrument, fixed to the carriage, to read the printed dots and adjust printer settings, characterized in that the calibration instrument comprises a module as claimed in claim 1.

* * * * *